Patented Apr. 16, 1940

2,197,101

UNITED STATES PATENT OFFICE 2,197,101

OXIDATION OF SUBSTITUTED AROMATIC HYDROCARBONS

Philip Eaglesfield, Carshalton, England, assignor to The Distillers Company Limited, Edinburgh, Scotland, a British company No Drawing. Application December 14, 1938, Serial No. 245,801. In Great Britain January 1, 1938

7 Claims. (Cl. 260—592)

This invention relates to the oxidation of α-methyl styrene and its nuclear-substituted alkyl derivatives for the production of acetophenone or nuclear alkyl substituted acetophenone and formaldehyde.

I have found that if oxygen or air is passed through α-methyl styrene in the presence of an oxidising catalyst such as a metal oxide, the α-methyl styrene is to a considerable extent oxidised to acetophenone and formaldehyde according to the equation:

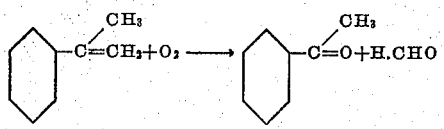

Metal oxides known to be suitable as oxidising catalysts such as the oxides of nickel, manganese, vanadium, iron, chromium and cobalt may be used; also certain oxygen carriers are suitable among which may be mentioned manganese acetate.

The reaction is preferably conducted at a raised temperature for example 60° C–160° C., reflux being provided. At such a temperature most of the formaldehyde is carried away with the exit gases from which it may be recovered. Preferably the air or oxygen is introduced in a finely divided form, as for example through a sintered glass plate or tube; alternatively the air or oxygen may be passed up a packed tower or column down which flows a suspension of catalyst in the α-methyl styrene. In the latter method of working it is also possible to use a tower or column in which the packing material is impregnated or coated with the oxidation catalyst. The reaction proceeds smoothly and with good efficiency, and the products can be separated readily by filtration and fractional distillation, unchanged α-methyl styrene being returned to the process.

The reaction may be carried out either in the presence or in the absence of a solvent or diluent, such for example as isopropylbenzene.

The following example illustrates in detail the way in which the invention may be carried into effect:

Example 1

A catalyst was first prepared by impregnating wood charcoal granules with a hot saturated aqueous solution of ammonium vanadate and then drying the granules and heating them at 400° C. in a stream of nitrogen. A vertical steel column eight feet high and two and a half inches internal diameter fitted with a jacket for steam heating was packed with 7 litres of the catalyst prepared as above described. Air was admitted at the bottom of the column whilst the α-methyl styrene was fed to the top of the column. The hot gases leaving the top of the column and consisting mainly of nitrogen, formaldehyde, and unconverted α-methyl styrene vapour were passed through a condenser and separator from which the gas was separated from most of the α-methyl styrene. The liquid collecting in the separator was returned continuously to the top of the column whilst the gas was passed to a water scrubber to remove the formaldehyde.

The liquid reaction products collecting at the bottom of the column were withdrawn continuously and subjected to distillation to separate from one another any unchanged α-methyl styrene (which was returned to the top of the column) the desired product namely aceto-phenone, and a residue of polymerised material.

In the case of maintaining a temperature of 130° C. in the column and a rate of flow of α-methyl styrene of 1,000 ccs. per hour and a rate of flow of air of 400 litres per hour the reaction products collecting at the foot of the column contain approximately 15% of acetophenone the percentage total conversion of the α-methyl styrene per passage being 24%.

Generally speaking with increase of temperature the through-put can be increased but the efficiency is diminished, i. e., the tendency to produce unwanted polymers is increased.

For continuous operation on the counter-current principle the optimum range of temperatures is about 80–100° C. The cost of raw material being the principal consideration in the practical sense the manufacture may be carried out batch-wise in which case a temperature as low as 60° C. may be advisable, the through-put being low but the efficiency being high.

If desired the air may be finely divided by means of some form of atomising or dispersing device but effective aeration is all that is actually required.

Further examples are as follows:

Example 2

Finely divided dry air was passed continuously through α-methyl styrene in which was suspended a small quantity of finely divided manganese dioxide, the temperature being maintained at approximately 130° C. In about six hours 37 per cent of the α-methyl styrene was converted to acetophenone and formaldehyde. Substantially the whole of the remaining α-methyl styrene was recovered unchanged.

*Example 3*

α-methyl styrene diluted to 50% with isopropyl benzene, and kept at 100° C. in the presence of 1% vanadium pentoxide, gave when air was passed through in a continuous finely divided stream for 4½ hours a product containing 17% of acetophenone. The efficiency was 63%.

If the above described method is applied to a nuclear alkyl substituted derivative of α-methyl styrene the corresponding substituted acetophenone is obtained.

I have found that the oxidation of α-methyl styrene and the like by air is inhibited by soluble organic copper salts and preferably therefore the use of metallic copper in the construction of the reaction vessel should be avoided. Steel equipment is quite satisfactory.

What I claim is:

1. The method of treating α-methyl styrene which comprises subjecting it to the action of a stream of a gas containing free oxygen in the presence of an oxidising catalyst at a temperature of from 60° C. to 160° C. whereby acetophenone and formaldehyde are formed, and separating out these resultant products.

2. The method according to claim 1 but using a nuclear-alkyl-substituted derivative of the α-methyl styrene to produce the corresponding nuclear alkyl substituted acetophenone.

3. The method according to claim 1 in which the gas containing free oxygen and the α-methyl styrene are contacted on the counter-current principle.

4. The method according to claim 1 in which the α-methyl styrene is treated in solution in a solvent thereof.

5. The method according to claim 1 in which the α-methyl styrene is treated in the form of a solution thereof in isopropylbenzene.

6. The method according to claim 1 in which the catalyst used is an oxide of a metal taken from the group consisting of nickel, iron, vanadium, chromium, manganese and cobalt.

7. The method of treating α-methyl styrene which comprises subjecting it to the action of a stream of a gas containing free oxygen in the presence of an oxidation promoter of the class consisting of oxidation catalysts and oxygen carriers at a temperature of from 60° C. to 160° C. whereby acetophenone and formaldehyde are formed, and separating out these resultant products.

PHILIP EAGLESFIELD.